(12) United States Patent
Forster-Knight et al.

(10) Patent No.: US 10,634,540 B2
(45) Date of Patent: Apr. 28, 2020

(54) MONITORING SYSTEMS AND METHODS

(71) Applicant: South East Water Corporation, Frankston, Victoria (AU)

(72) Inventors: Andrew Forster-Knight, Frankston South (AU); Jean-Paul Lambe, Mornington (AU)

(73) Assignee: South East Water Corporation, Frankson, Victoria (AU)

( * ) Notice: Subject to any disclaimer, the term of this patent is extended or adjusted under 35 U.S.C. 154(b) by 0 days.

(21) Appl. No.: 15/507,595

(22) PCT Filed: Sep. 3, 2015

(86) PCT No.: PCT/AU2015/050519
§ 371 (c)(1),
(2) Date: Feb. 28, 2017

(87) PCT Pub. No.: WO2016/033653
PCT Pub. Date: Mar. 10, 2016

(65) Prior Publication Data
US 2017/0227391 A1 Aug. 10, 2017

(30) Foreign Application Priority Data
Sep. 3, 2014 (AU) ................................ 2014903521

(51) Int. Cl.
*G01F 23/00* (2006.01)
*E02D 29/12* (2006.01)
(Continued)

(52) U.S. Cl.
CPC ......... *G01F 23/0007* (2013.01); *E02D 29/12* (2013.01); *G01F 1/002* (2013.01);
(Continued)

(58) Field of Classification Search
CPC .. G01F 23/0007; G01F 23/00; G01F 23/0053; G01F 23/0061; G01F 23/0076;
(Continued)

(56) References Cited

U.S. PATENT DOCUMENTS 6,378,554 B1  4/2002  Stuthers
6,395,181 B1  5/2002  Mullerheim
(Continued)

FOREIGN PATENT DOCUMENTS

AU   2014100179 A4   4/2014
CN   1473075 A       2/2004
(Continued)

OTHER PUBLICATIONS

Stoianov et al., PIPENET: A Wireless Sensor Network for Pipeline Monitoring, Apr. 25-27, 2007, IPSN '07, Cambridge, Massachusetts, pp. 264-273.*
(Continued)

Primary Examiner — Toan M Le
(74) Attorney, Agent, or Firm — Kilpatrick Townsend & Stockton LLP

(57) ABSTRACT

A monitoring system for an access chamber to a pipe network. The system includes at least one sensor for determining a fluid condition associated with fluid in a conduit of the pipe network and at least one threshold level indicator for determining a threshold fluid level in the access chamber, the at least one threshold level indicator being associated with the at least one sensor. The system further includes a controller for receiving output signals from the at least one sensor and the at least one threshold level indicator and for controlling supply of power to the at least one sensor and a wireless transceiver in communication with the controller to allow the controller to communicate with a remote server over a communications network. The controller is arranged (Continued)

to supply power to the at least one sensor in response to receiving an output signal from the at least one threshold level indicator indicative of the fluid level having exceeded the threshold fluid level.

21 Claims, 7 Drawing Sheets

(51) Int. Cl.
    *G01F 1/00*         (2006.01)
    *G01F 23/30*       (2006.01)
    *G08B 21/18*       (2006.01)
    *H04Q 9/00*        (2006.01)
    *G01F 23/296*     (2006.01)

(52) U.S. Cl.
    CPC ........... *G01F 23/30* (2013.01); *G08B 21/182* (2013.01); *H04Q 9/00* (2013.01); *G01F 23/296* (2013.01); *H04Q 2209/40* (2013.01)

(58) Field of Classification Search
    CPC ...... G01F 23/0092; G01F 23/14; G01F 23/28; G08B 21/182; H04Q 9/00; H04Q 2209/40
    See application file for complete search history.

(56) References Cited

U.S. PATENT DOCUMENTS

| | | | |
|---|---|---|---|
| 6,491,060 | B2 | 12/2002 | Stuthers |
| 6,595,051 | B1 | 7/2003 | Chandler |
| 6,638,023 | B2 | 10/2003 | Scott |
| 7,014,777 | B2 | 3/2006 | Ishikawa |
| 7,072,945 | B1 | 7/2006 | Nieminen |
| 7,289,923 | B2 | 10/2007 | Marovitz |
| 7,342,506 | B2 | 3/2008 | Paoli et al. |
| 7,799,215 | B2 | 9/2010 | Matheis |
| 8,594,851 | B1 | 11/2013 | Smaidris |
| 8,600,568 | B2 | 12/2013 | Smaidris |
| 8,983,667 | B2 | 3/2015 | Smaidris |
| 2003/0075502 | A1 | 4/2003 | Mullerheim |
| 2005/0072469 | A1 | 4/2005 | Preul |
| 2006/0078435 | A1 | 4/2006 | Burza |
| 2006/0267756 | A1 | 11/2006 | Kates |
| 2007/0103324 | A1 | 5/2007 | Kosuge et al. |
| 2008/0155064 | A1* | 6/2008 | Kosuge ............... E03F 7/00 709/219 |
| 2008/0290011 | A1 | 11/2008 | Capano |
| 2009/0081050 | A1 | 3/2009 | Moore |
| 2009/0082977 | A1 | 3/2009 | Parkinson |
| 2009/0201123 | A1 | 8/2009 | Kafry |
| 2010/0156632 | A1 | 6/2010 | Hyland et al. |
| 2010/0268389 | A1 | 10/2010 | Wurm |
| 2011/0068060 | A1 | 3/2011 | Hatten |
| 2011/0120561 | A1 | 5/2011 | Quigley et al. |
| 2011/0168609 | A1 | 7/2011 | McQuade |
| 2011/0240535 | A1 | 10/2011 | Pehrson |
| 2011/0304475 | A1 | 12/2011 | Higgins et al. |
| 2011/0307106 | A1 | 12/2011 | Dutt et al. |
| 2012/0029709 | A1 | 2/2012 | Safreno |
| 2012/0194502 | A1 | 8/2012 | Smith |
| 2013/0243614 | A1 | 9/2013 | Moon et al. |
| 2013/0307701 | A1 | 11/2013 | Forster-Knight |
| 2015/0227142 | A1 | 8/2015 | Hutchings |

FOREIGN PATENT DOCUMENTS

| | | | |
|---|---|---|---|
| CN | 101021725 | A | 8/2007 |
| CN | 101042587 | A | 9/2007 |
| CN | 201258267 | | 6/2009 |
| CN | 201496242 | | 6/2010 |
| CN | 101800766 | A | 8/2010 |
| FR | 2944869 | A1 | 10/2010 |
| JP | 2010203964 | | 9/2010 |
| JP | 2014-139373 | A | 7/2014 |
| NZ | 589998 | A | 10/2011 |
| WO | 2006-060296 | A2 | 6/2006 |
| WO | 2011-017104 | A1 | 2/2011 |
| WO | 2011110792 | A2 | 9/2011 |
| WO | 2013-0149281 | A1 | 10/2013 |

OTHER PUBLICATIONS

U.S. Appl. No. 13/676,177, "Final Office Action", dated Feb. 19, 2016, 12 pages.
U.S. Appl. No. 13/676,177, "Final Office Action", dated May 15, 2017, 14 pages.
U.S. Appl. No. 13/676,177, "Non-Final Office Action", dated Sep. 2, 2016, 10 pages.
U.S. Appl. No. 13/676,177, "Non-Final Office Action", dated Sep. 8, 2015, 9 pages.
U.S. Appl. No. 14/597,387, "Non-Final Office Action", dated Jun. 30, 2017, 16 pages.
Cheng et al., "Flood Control Management System for Reservoirs", *Environmental Modelling & Software*, No. 19, 2004, pp. 1141-1150.
International Search Report and Written Opinion dated Oct. 21, 2014 for PCT Application No. PCT/AU2014/000887, all pages.
Search Report dated May 23, 2016 for Chinese Patent Application No. 201280071396.8, all pages.
International Search Report (7 pages) and Written Opinion (10 pages) dated Nov. 13, 2015, prepared by the Australian Patent Office as International Searching Authority for PCT International Patent Application No. PCT/AU2015/050519.
Office action dated August 201280071396.8, dated Jun. 1, 2016.
First Exam Report for New Zealand Patent Application No. 615470, dated Jan. 15, 2015.
First Exam Report for New Zealand Patent Application No. 703230, dated Jan. 15, 2015.
International Search Report and Written Opinion of PCT/AU2012/000903, dated Oct. 17, 2012.
Supplementary EU search report for EP Application No. 12865548, dated Jul. 14, 2014.
Extended European Search Report, dated Mar. 27, 2018, prepared by European Patent Office for EP Application No. 15838486.7, 8 pages.

* cited by examiner

MONITORING SYSTEMS AND METHODS

CROSS-REFERENCE TO RELATED APPLICATIONS

This application is a national phase of PCT International Application Number PCT/AU2015/050519, filed on Sep. 3, 2015, which claims the benefit of Australian Patent Application Number 2014903521, filed on Sep. 3, 2014. Each of these applications is hereby incorporated by reference in its entirety for all purposes.

TECHNICAL FIELD

Described embodiments generally relate to monitoring systems and methods of managing such monitoring systems. Some embodiments specifically relate to monitoring systems for conduit or pipe networks, such as sewer networks, while other embodiments relate to management systems for managing a network of such monitoring systems.

BACKGROUND

Domestic or industrial water supply requirements are generally met by providing water through buried (i.e. underground) fluid conduits, such as pipes, that can form part of an extensive network of such conduits. Sewerage transport also uses such a network of conduits.

The monitoring of such networks of fluid conduits is generally conducted in order to detect rising levels of fluid within the conduits, for example, as a result of blockages within the conduits, before overspill occurs causing damage to the environment and surrounding housing and/or public infrastructure.

It is desired to address or ameliorate one or more shortcomings or disadvantages associated with existing systems and methods for monitoring fluid conditions in fluid conduits, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a monitoring system for an access chamber to a pipe network, the system comprising:
  at least one sensor for determining a fluid condition associated with fluid in a conduit of the pipe network;
  at least one threshold level indicator for determining a threshold fluid level in the access chamber, the at least one threshold level indicator being associated with the at least one sensor;
  a controller for receiving output signals from the at least one sensor and the at least one threshold level indicator and for controlling supply of power to the at least one sensor;
  a wireless transceiver in communication with the controller to allow the controller to communicate with a remote server over a communications network;
  wherein the controller is arranged to supply power to the at least one sensor in response to receiving an output signal from the at least one threshold level indicator indicative of the fluid level having exceeded the threshold fluid level.

In some embodiments, the controller may be arranged to discontinue the supply of power to the at least one sensor in response to receiving an output signal from the at least one threshold level indicator indicative of the fluid level having fallen below a threshold fluid level.

In some embodiments, the controller may be arranged to supply power to the transceiver in response to receiving an output signal from the at least one threshold level indicator indicative of the fluid level having exceeded the threshold fluid level.

The at least one sensor may be a continuous sensor, such as an analogue sensor, or a discrete sensor, such as a digital sensor. In some embodiments, the system may comprise at least one continuous sensor and at least one discrete sensor.

The at least one sensor may be arranged to sense a fluid condition, for example, at least one of fluid level, fluid flow, fluid pressure, noise, water quality, and/or hydrogen sulphide. The output signal from the at least one sensor may be indicative of the sensed fluid condition.

In some embodiments, the at least one sensor may be associated with multiple threshold level indicators and/or the at least one threshold level indicator may be associated with multiple sensors. For example, the at least one sensor may comprise a first sensor and a second sensor and the at least one threshold level indicator may comprise a first threshold level indicator and a second threshold level indicator, wherein the first and second sensors are associated with the first and second threshold level indicators, respectively, wherein the controller may be arranged to supply power to the first sensor in response to receiving an output signal from the first threshold level indicator indicative of the fluid level having exceeded a first threshold fluid level, and wherein the controller may be arranged to supply power to the second sensor in response to receiving an output signal from the second threshold level indicator indicative of the fluid level having exceeded a second threshold fluid level. The first and second sensors may be the same type of sensor or may be different sensors.

In some embodiments, the controller may further comprise a memory for storing data associated with an output signal from the at least one sensor indicative of fluid conditions in the conduit and/or access chamber. The controller may be configured to compare data associated with the received output signals to an expected range of values for each sensor and to send an alarm message if the data for at least one sensor falls outside an expected range for that sensor. For example, the controller may transmit the alarm message to a remote server.

The memory may include a control module comprising program code, which when executed by a processor is arranged to cause the controller to interact with at least one SIM card in order to transmit and/or receive data wirelessly using the wireless transceiver and/or to cause the controller to control the at least one sensor. In some embodiments, the control module comprises program code, which when executed by a processor is arranged to cause the controller to transmit a power switching signal to the power supply to turn on/off the sensor(s) and/or the wireless transceiver.

In some embodiments, the controller includes a switching circuit to control the transmission of a switching signal to the power supply to control the supply of power to the sensor(s) and/or the wireless transceiver.

In some embodiments, the monitoring system may comprise a wireless telemetry unit and the controller and wireless transceiver may be provided within the telemetry unit. The wireless telemetry unit may include a power source to supply power to the controller, to the at least one threshold level indicator and to the at least one sensor and may be free of reliance on an external power source. For example, the power supply may comprise a long-life battery. The long-life battery may have sufficient stored energy to support normal operation of the telemetry unit for several years. The power supply may comprise a replaceable battery. Furthermore, the telemetry unit, the at least one threshold level indicator and the at least one sensor may be configured for low power consumption and may be designed to satisfy standards required in order to be considered intrinsically safe.

In some embodiments, the telemetry unit may comprise at least one SIM card in order to transmit and/or receive data wirelessly using the transceiver. For example, the telemetry unit may comprise a first SIM card and a second SIM card, and the processor may be arranged to cause the controller to interact with the second SIM card in order to transmit and/or receive messages wirelessly using transceiver in response to determining that the first SIM card is ineffective or cannot get a signal.

In some embodiments, the controller may be arranged to transmit data associated with the fluid condition, such as the fluid level in the conduit and/or access chamber from the wireless transceiver to the remote server. For example, the controller may be configured to transmit the data to the remote server periodically or may be configured to transmit the data to the remote server in response to receiving the output signal from the at least one sensor.

In some embodiments, the monitoring system may comprise a blockage detection system, wherein the at least one sensor is a fluid level sensor.

In some embodiments, the at least one sensor may be an ultrasonic sensor. The at least one sensor may be arranged to measure fluid levels in the fluid conduit and/or access chamber in engineering units and survey level units. The controller may be configured to determine a flow rate in the fluid conduit and/or access chamber based on data received from the at least one sensor and parameters associated with the fluid conduit and/or access chamber. For example, the controller may be configured to determine the flow rate in the fluid conduit using the Manning equation. In some embodiments, the parameters associated with the fluid conduit and/or access chamber may comprise the radius of the sewer channel, the slope and roughness of the channel and/or other water quality parameters.

In some embodiments, the transceiver may be configured to transmit data to the remote server, wherein the data comprises measurements received from the at least one sensor, parameters associated with the fluid conduit and/or access chamber, and /or values calculated by the controller.

Some embodiments relate to a method of monitoring fluid conditions in an access chamber to a pipe network, the method comprising:
  providing a wireless telemetry unit within the access chamber, the wireless telemetry unit coupled to receive output signals from at least one sensor for determining a fluid condition of fluid in conduit of the pipe network and at least one threshold level indicator for determining a threshold fluid level in the access chamber, the at least one threshold level indicator being associated with the at least one sensor; and
  providing power to the at least one sensor in response to receiving an output signal from the at least one threshold level indicator indicative of the fluid level having exceeded the threshold fluid level; and
  receiving at the wireless telemetry unit output signals from the at least one sensor indicative of the fluid condition of fluid in the conduit.

In some embodiments, the method may further comprise discontinuing the supply of power to the at least one sensor in response to receiving an output signal from the at least one threshold level indicator indicative of the fluid level having fallen below a threshold fluid level.

In some embodiments, the method may further comprise transmitting data from the wireless telemetry unit to a remote server, the data being associated with the output signals from the at least one sensor. The method may comprise transmitting the data from the wireless telemetry unit to the remote server periodically or in response to receiving the output signal from the at least one sensor.

In some embodiments, the method may comprise the wireless telemetry unit processing the output signals to determine whether an alarm condition exists, and in response to determining that an alarm condition exists, the method may comprise the wireless telemetry unit sending an alarm notification to the remote server and/or a remote network node.

In some embodiments, the method may be operable in a blockage detection system for a pipe network to detect a blockage in a conduit of the pipe network.

In some embodiments, the method may further comprise determining a flow rate in the fluid conduit and/or access chamber based on data received from the at least one sensor and parameters associated with the fluid conduit and/or access chamber.

Some embodiments relate to a management system comprising a plurality of monitoring system as described above and a server arranged to receive data associated with sensed fluid conditions from the wireless telemetry units of respective monitoring systems via a wireless network. For example, the monitoring systems may be positioned within a water supply and drainage zone so that management by the server of sensed fluid conditions by each monitoring system allows identification of one or more conditions of interest within the water supply and drainage zone.

In some embodiment, the server may comprise program code to process the data according to a set of stored rules accessible to the server. For example, the processing of the received data may include accessing stored historical data received from the wireless telemetry units and determining whether an event of interest appears to be occurring or is likely to occur in relation to a given pipe. The server may comprise an interface component to communicate with a client device in relation to the received data representative of the sensed conditions.

In some embodiments, the server may be arranged to transmit data to the wireless telemetry units of respective monitoring systems via a wireless network. For example, the data may comprise at least one of operating instructions for the controller, the sensor(s) and/or threshold level indicator(s).

Some embodiments relate to a management method, comprising:
  receiving at a server, data from a plurality of monitoring systems of pipe networks as described above, the data being indicative of at least a sensed fluid condition; and processing the data to infer trends and/or determine an event of interest in relation to the access chambers.

In some embodiments, the management method may comprise detecting a blockage in a conduit of the pipe network.

The method may further comprise processing the data to determine whether an alarm, fault or special condition is indicated in relation to one or more of the manholes and transmitting a notification message to at least one predetermined notification recipient if the server determines that an alarm, fault or special condition is indicated.

BRIEF DESCRIPTION OF THE DRAWINGS

Embodiments are described in further detail below, by way of example, with reference to the accompanying drawings, in which.

DETAILED DESCRIPTION

Described embodiments generally relate to monitoring systems and methods of managing such monitoring systems. Some embodiments specifically relate to monitoring systems for conduit or pipe networks, such as sewer pipe networks, while other embodiments relate to management systems for managing a network of such monitoring systems.

In particular, some embodiments relate to a monitoring system for an access chamber or manhole providing access to a pipe network, the monitoring system including a wireless telemetry unit cooperating with at least one threshold level indicator and at least one sensor to determine at least one fluid condition of fluid in a conduit of the pipe network. The wireless telemetry unit may be configured to supply power to the at least one sensor in response to receiving an output signal from the at least one threshold level indicator indicative of a fluid level within the access chamber or manhole. Data from the sensed conditions can then be used to automatically generate alarms or other notifications, for example, and/or may be transmitted wirelessly to a remote server or management system.

By providing such monitoring systems at manholes of pipe networks, fluid conditions of fluid in the manhole and/or conduit may be determined in an efficient and effective manner that minimises power consumption and preserves energy.

For example, the threshold fluid level may be indicative of a fluid level of interest in the manhole, wherein when the fluid level is below the threshold fluid level, the fluid conduit is deemed to be functioning in an expected manner and when the fluid level reaches or exceeds the threshold fluid level, the fluid conduit is deemed to be functioning in an unexpected manner and it may be desirable for further measurements indicative of the fluid conditions in the manhole to taken for recording purposes and/or to determine whether or not action should be taken immediately or at some time in the future. Power may be supplied to the sensor only once the fluid level in the manhole exceeds the threshold fluid level, as indicated by the threshold level indicator. In this way, measurements may be taken by the sensor in a controlled manner for predefined fluid levels of interest and the power consumption of the sensor may be reduced.

Figure 1:
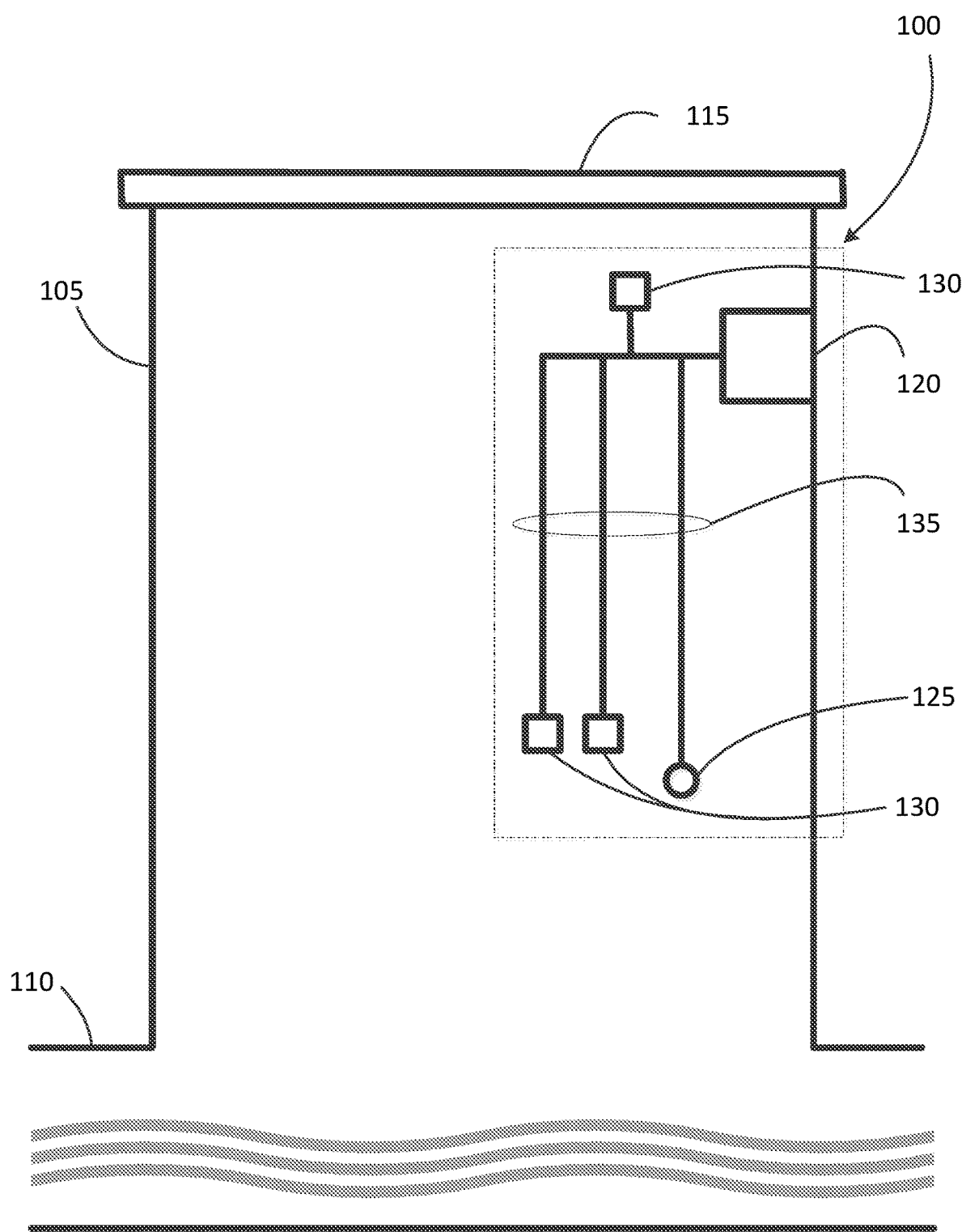
FIG. 1 is a schematic representation of an access chamber providing access to a pipe network and provided with a monitoring system according to some embodiments.

Referring to FIG. 1, there is shown a monitoring system 100 disposed in an access chamber or manhole 105 providing access to a fluid conduit or pipe 110 forming part of a network of conduits or pipes. The manhole 105 may be provided with a lid or cover 115 to prevent unauthorised or accidental access to the manhole 105.

The monitoring system 100 includes a telemetry unit 120 for monitoring fluid conditions of fluid in the manhole 105 or the conduit 110 using at least one threshold level indicator 125 and at least one sensor 130. The threshold level indicator(s) 125 and sensor(s) 130 may be electrically and communicatively coupled to the telemetry unit 120 by means of one or more communications cables 135, which may include distinct or separate power and signalling communications channels. The telemetry unit 120 may be fully waterproofed and pressure sealed to an IP68 rating.

The sensor(s) 130 may rely on the provision of power from the telemetry unit 120 via cable 135 in order to function. The telemetry unit 120 may be arranged to allow or turn on power to the sensor(s) 130 when it is desired to take sensor readings in relation to fluid conditions in the conduit 110, and the telemetry unit 120 may be arranged to disallow or turn off power to the sensor(s) 130 at other times, as will be discussed in more detail below with reference to FIG. 3. In this way, the sensor(s) 130 do not draw power on a continuous basis, thereby reducing the overall power consumption of the monitoring system 100.

The threshold level indicator(s) 125 and sensor(s) 130 may be provided in a separate sensor housing or multiple threshold level indicators 125 and/or sensors 130 may be housed within a single housing. Further, more than one type of measurement may be obtained by each sensor 130.

The sensor(s) 130 may include at least one of a continuous sensor, such as an analogue sensor, a discrete sensor, such as a digital sensor, a level sensor, a pressure transducer, a laser sensor and an audio sensor. The telemetry unit 120 may include analogue and/or digital input/output ports (to be shown) to accommodate the various sensor(s) 130.

The sensor(s) 130 may include sensors 130 to detect fluid levels, fluid flow, fluid pressure, noise, temperature water quality and/or hydrogen sulphide, for example. The sensor(s) 130 may be used to detect other conditions and more than one type of sensor may be used to measure one type of condition (e.g. more than one water quality sensor may be used, such as conductivity, turbidity, PH levels and/or chlorine content sensors). Depending on what information is desired to be gathered, a sub-set of those sensors 130 may be provided in the manhole 105. For example, it may be desired in some instances to measure fluid levels, fluid flow, fluid pressure and noise and in other instances to measure fluid levels, fluid flow, fluid pressure and water quality (e.g. chlorine content, turbidity and/or electrical conductivity).

In some embodiments, the sensor(s) 130 may be an ultra-sonic sensor and may be mounted towards the lid or cover 115 of the manhole 115. In some embodiments, the ultrasonic sensor may allow for elements in the manhole 115, such as tables, ladders etc. to be filtered out automatically so that only the condition of interest is recorded by the ultrasonic sensor. Mounting of the ultra-sonic sensor and the telemetry unit 120 at or toward the lid or cover 115 of the manhole 115 may make it easier to install the monitoring system 100. For example, it may be installed by a single person without a need for confined space entry.

In some embodiments, where the at least one sensor 130 is a continuous or analog level sensor, increases and rates of increases of fluid levels in the fluid conduit 110 and/or manhole 105, for example as may occur due to a presence of a blockage or partial blockage in the conduit 110, may be detected and measured to prevent or at least mitigate any damage which may arise as a result of the blockage may be taken in advance of such damage occurring. By using a continuous or analog level sensor, the changes in fluid levels may be closely and consistently monitored.

In some embodiments, the sensor(s) 130 may be arranged to measure fluid levels in the fluid conduit 110 and/or manhole 105 in engineering units, such as meters, and survey level (height above sea level), such as Australian Height Datum (AHD) or (mAHD). The telemetry unit 120 may be configured to receive data comprising the measurements from the sensor(s) and may calculate a flow rate in the fluid conduit 110 and/or manhole 105 based on the received data and parameters associated with the fluid conduit 110 and/or manhole 105. For example, the telemetry unit 120 may have access to or have stored thereon parameters such as the radius of the sewer channel, the slope and roughness of the channel and/or other water quality parameters. In some embodiments, the telemetry unit 120 may approximate the flow rate by employing the Manning equation or Gauckler-Manning-Strickler formula which is defined as $$V = \frac{k}{n} R_h^{2/3} S^{1/2},$$

where: V is the cross-sectional average velocity n, is the Gauckler-Manning coefficient, $R_h$ is the hydraulic radius, S is the slope of the hydraulic grade line or the linear hydraulic head loss, and k is a conversion factor between SI and English units. For example, k=1 for SI units, and k=1.49 for English units.

Figure 2:
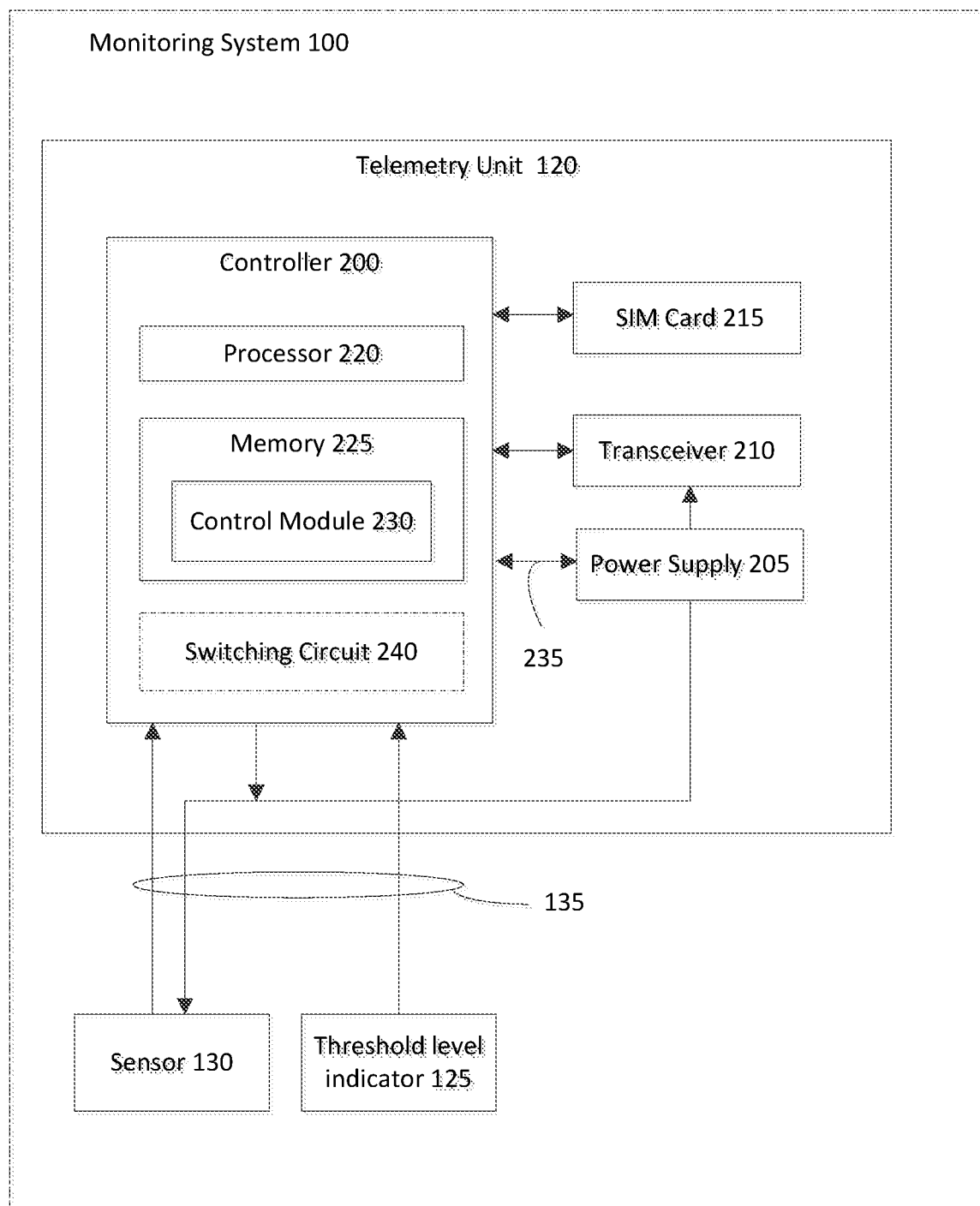
FIG. 2 is a block diagram of the monitoring system of FIG. 1 including a telemetry unit.

As depicted in FIG. 2, the telemetry unit 120 of the monitoring system 100 may comprise a controller 200, a power supply 205, a transceiver 210 and at least one subscriber identity module (SIM) card 215. The telemetry unit 120 may comprise additional components and/or circuitry (not shown) as judged by a person of ordinary skill in the art to be necessary or desirable in order to carry out the functions described herein. For example, the telemetry unit 120 may comprise analogue to digital or digital to analogue conversion circuits (not shown), function testing circuits, digital signal processing components and/or display components to provide feedback to the user.

In one embodiment, the telemetry unit 120 includes communications ports, for example, USB ports, to allow for maintenance checks, data downloads, firmware upgrades, etc., as discussed in more detail below.

The controller 200 may include a processor 205 (or multiple processing components operating together) and a memory 210. The memory 210 may comprise a combination of volatile and non-volatile computer readable storage and may have sufficient capacity to store program code executable by processor 220 in order to perform appropriate processing functions as described herein. For example, memory 225 may include a control module 230 comprising program code, which when executed by the processor 205 may be arranged to cause the controller 200 to interact with at least one SIM card 215 as necessary in order to establish a remote data connection to transmit and/or receive messages wirelessly using transceiver 210 and to control the sensor(s) 130. In some embodiments, the control module 230 may comprise program code, which when executed by the processor 205 is arranged to cause the controller 200 to switch power on and off to the sensors 130.

In some embodiments, the controller 200 may be arranged or configured to receive operating instructions for the threshold level indicator(s) 125 and the sensor(s) 130, for example, via transceiver 210, to allow for remote control of and adjustment of settings associated with the threshold level indicator(s) 125 and the sensor(s) 130.

The controller 200 may be configured to calculate the flow rate in the fluid conduit 110 and/or manhole 105 based on data received from the sensors(s) 130 and parameters associated with the fluid conduit 110 and/or manhole 105, for example, by employing the employing the Manning equation or Gauckler-Manning-Strickler formula defined above. In some embodiments, the memory 210 may be arranged to store the parameters associated with the fluid conduit 110 and/or manhole 105. For example, the memory 210 may include parameters such as the radius of the sewer channel, the slope and roughness of the channel and/or other water quality parameters. In some embodiments, the telemetry unit 120 may comprise at least two SIM cards 215 as a back-up or fail-safe measure. For example, a first SIM card may be associated with a first communication network provider and a second SIM card may be associated with a second and different mobile (e.g., GPRS) communication network provider. Thus, if a data connection cannot be established using a first SIM card, or the first SIM is deemed otherwise inoperable, the processor 220 may be arranged to cause the controller 200 to interact with the second SIM card in order to establish a data connection and transmit and/or receive messages wirelessly using transceiver 210.

The power supply 205 may comprise a long-life battery having the capacity to supply operating power to the telemetry unit 120 for a period of several years, for example up to about five years, before needing to be changed, assuming normal operation of telemetry unit 120 and normal operation of the power supply 205. The long life battery may comprise a lithium battery, for example. In other embodiments, the power supply 205 may comprise a replaceable battery.

The power supply 205 is arranged to provide power to the controller 200, the transceiver 210 and other circuitry within telemetry unit 120, as appropriate. The power supply 205 may also provide power to the sensor(s) 135 via cable 135, for example, in response to power switching signals 235 from controller 200, as discussed below. In some embodiments, the controller 200 further comprises a switching circuit 240 to control the transmission of the power switching signal 235 to the power supply 205 for supplying power to the sensor(s) 130 and/or the transceiver 210.

The telemetry unit 120, including the controller 200, the power supply 205, the transceiver 210 and/or the SIM card 215 and/or the threshold level indicator 125 and the sensor(s) 130 may be configured for low power consumption. In some embodiments, the telemetry unit 120 and/or threshold level indicator 125 and the sensor(s) 130 may be designed to be intrinsically safe (IS) by employing low current and voltage circuit components to thereby limit energy available that may cause a spark and become an ignition source.

The transceiver 210 may have a transmitting or a transmitting and receiving antenna (not shown) concealed within the telemetry unit 120 and an outer casing part of the telemetry unit 120 may be formed of a suitable non-conductive material to allow sufficient signal transmission strength out of and into the telemetry unit 120. In other embodiments, an external antenna may be disposed on an outer casing part of the telemetry unit 120 and/or on the cover 115. The transmitting and receiving antenna may be designed to be intrinsically safe (IS) by employing low current and voltage circuit components to thereby limit energy available that may cause a spark and become an ignition source.

The transceiver 210 may be configured to transmit data to the server 405 using the GSM or GPRS/3G standards for mobile telephony or their technological successors. For example, the transceiver 210 may be a quad band transceiver capable of tuning into GSM 850, GSM 900, GSM 1800, and GSM 1900.In other embodiments, the transceiver 210 may be a dual-band or a tri-band transceiver 210. In other embodiments, the transceiver 210 may be configured to transmit data to the server 405 using packet routing protocols.

In some embodiments, the transceiver 210 may be configured to transmit data to the server 405 such as data comprising measurements received from the sensor(s) 130, parameters associated with the fluid conduit 110 and/or manhole 105, and /or values calculated by the controller 200, for example, the flow rate in the fluid conduit 110 and/or manhole 105.

The threshold level indicator 125 may be provided as a float switch, so that when a fluid level in the fluid conduit 110 and/or manhole 105 rises above a threshold level of the threshold level indicator 125, causing the float switch to tilt, for example, the threshold level indicator 125 provides an output signal to the controller 200 of the telemetry unit 120. For this purpose, the threshold level indicator may include a tilt switch, an accelerometer or other means of generating an output signal in response to a detected fluid level change.

In response to receipt of the output signal from the threshold level indicator 125, the controller 200 may transmit a power switching signal 235 to the power supply 205 to cause the power supply to supply power to at least one of the sensors 135 associated with the threshold level indicator 125. Once power has been supplied to the sensors 130, the sensors 130 may be arranged to sense a constant (or frequent enough to be practically constant) accurate measure of fluid conditions, such as fluid levels associated with the fluid conduit 110, such as the fluid levels within the fluid conduit 110 and/or manhole 105 and may provide a constant (or sufficiently regular as to be effectively constant) output signal to the controller 200 of the telemetry unit 120.

The threshold level indicator 125 may also provide an output signal to the controller 200 of the telemetry unit 120 when the fluid level in the fluid conduit 110 and/or manhole 105 drops below a threshold level for the threshold level indicator 125 causing the threshold level indicator 125 to deactivate.

In some embodiments, the monitoring system 100 may include a single threshold level indicator 125, associated with multiple sensors 130 and operable to cause the controller 200 to transmit a power switching signal 235 to the power supply 205 to cause the power supply to supply or cut off supply of power to the associated sensors 130. In some embodiments, the monitoring system 100 may include multiple threshold level indicators 125, each associated with at least one sensor 130 and each independently operable to cause the controller 200 to transmits a power switching signal 235 to the power supply 205 to cause the power supply to supply or cut off supply of power to the associated at least one sensor 130.

Figure 3:
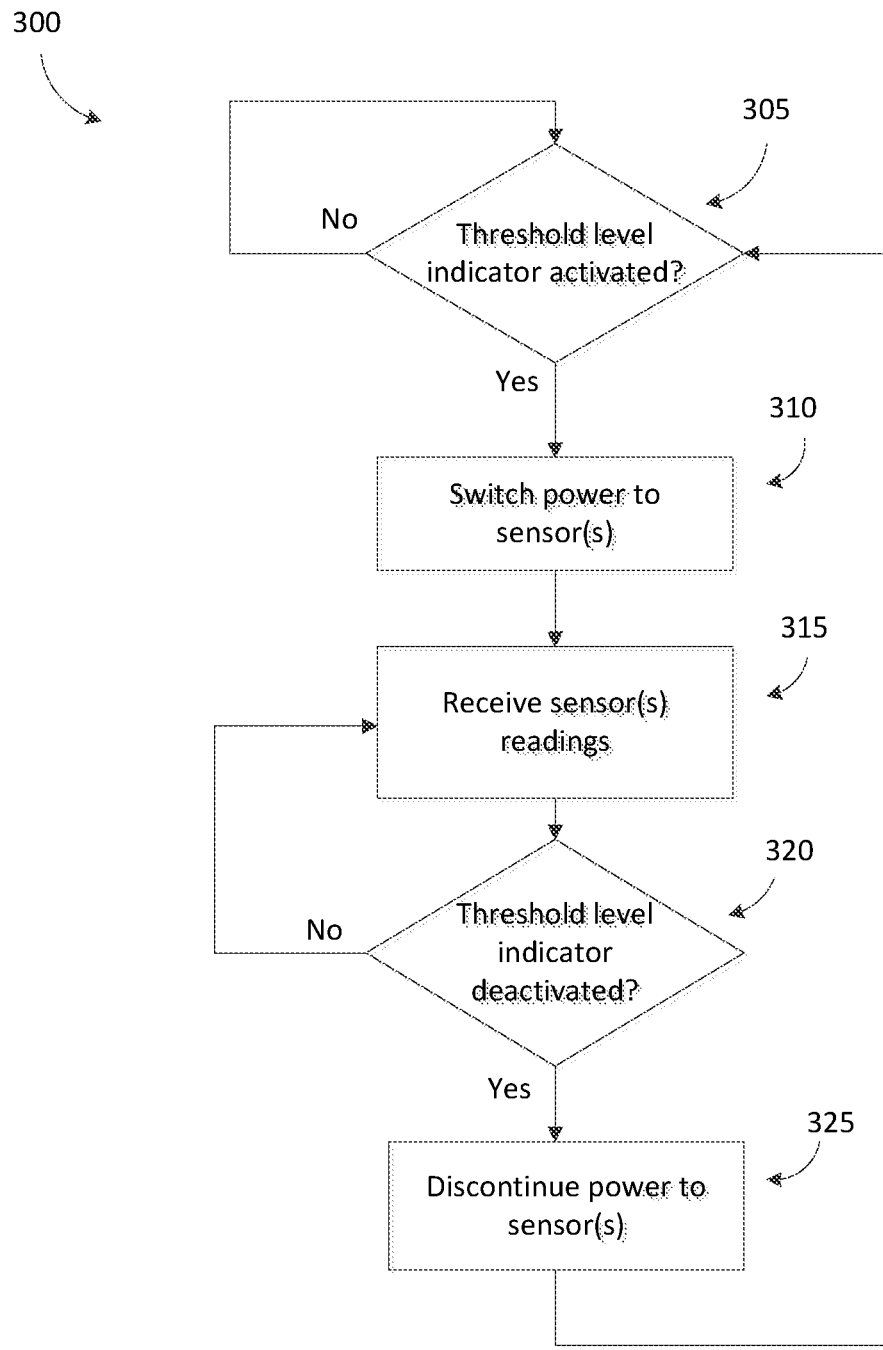
FIG. 3 is a flowchart of a method of monitoring fluid conditions in a conduit implemented by the telemetry unit of FIG. 2.

By providing power to the sensor(s) 130 to only detect fluid levels within a range of interest as defined by the threshold level of the threshold level indicator 125, the battery life of the power supply 230 may be preserved and power consumption minimised Referring now to FIG. 3, a method 300 of monitoring of fluid conditions in a manhole by the monitoring system 100 is shown and described in further detail. The method 300 may be executed by the controller 200 of the telemetry unit 120 to control operation of the one or more sensor(s) 130 configured to sense conditions of fluid within the fluid conduit 110 and/or manhole 105 with which the telemetry unit 120 is associated.

At 305, the controller 200 awaits an output signal from the threshold level indicator 125 indicating that the fluid level in the within the fluid conduit 110 and/or manhole 105 has exceeded a threshold level associated with the threshold level indicator 125.

On receipt of an output signal from the threshold level indicator 125 indicating that the fluid level has exceeded a threshold level, the controller 200 transmits at 310 a power switching signal 235 to the power supply 205 to cause the power supply to supply power to the sensor(s) 130. In one embodiment, the processor 220 executes code to cause the controller 200 to transmit the power switching signal 235 to the power supply 205 to turn on the sensor(s) 130. In another embodiment, the controller 200 includes a switching circuit 240, such as a transistor switch, wherein receipt of the output signal from the threshold level indicator 125 activates or "turns on" the switching circuit 240 allowing the power switching signal 235 to be transmitted to the power supply 205 to cause power to be supplied to the sensor(s) 130.

In some embodiments, once power is switched to the sensor(s) 130, the sensor(s) 130 may require some time to "warm-up", for example to power up their own internal electronics, run their own operational diagnostics (if appropriate), and possibly indicate their operational states (e.g. properly operational or partially or fully non-operational).

Once the sensor(s) 130 have warmed-up and assuming they are operational, the sensor(s) 130 measure the relevant conditions and indicate a value of the condition they are configured to sense by providing a digital or analogue output signal to the controller 200 via the cable 135 at 315.

In some embodiments, the output signal from the sensor(s) 130 is converted from analogue to digital signals, if appropriate, and is encoded and packetised for transmission to a server 405 when received by the controller 200 to thereby provide a constant (or sufficiently regular as to be effectively constant) indication of the sensed fluid condition as discussed below with reference to FIG. 4 and FIG. 5.

Figure 6:
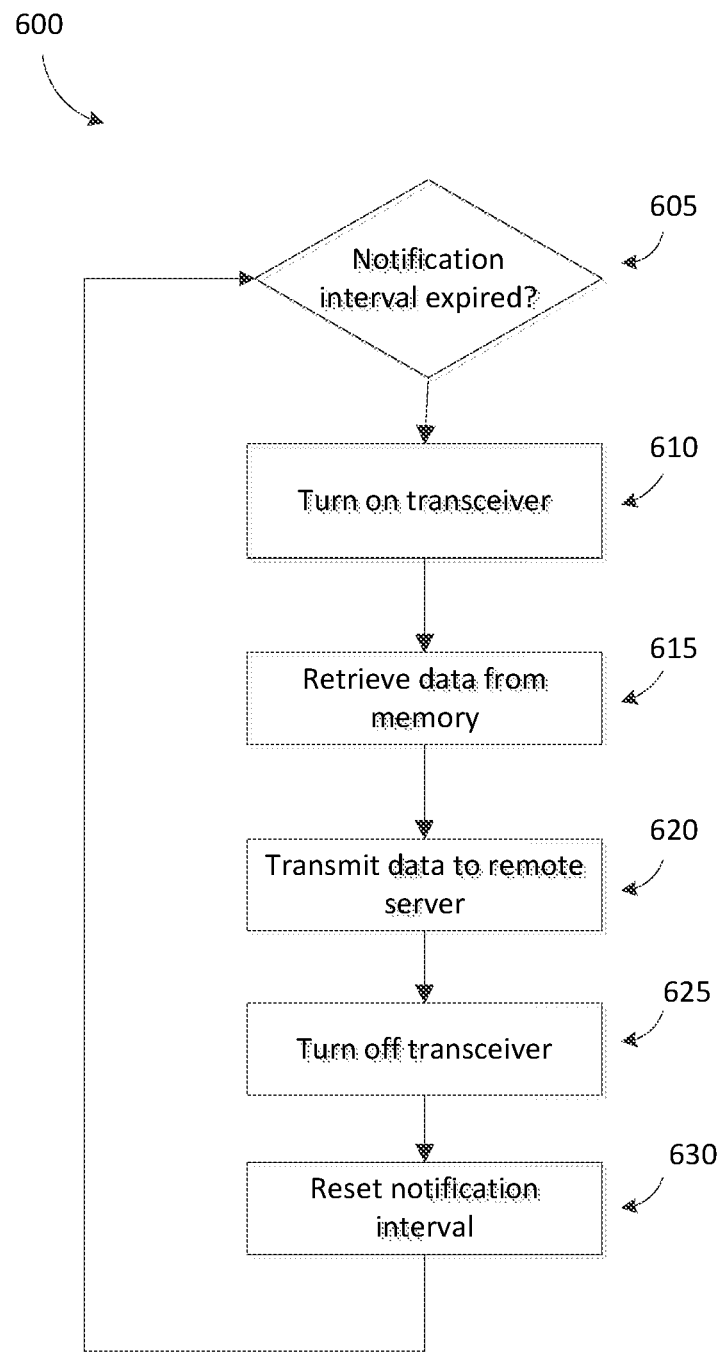
FIG. 6 is a flowchart of a method of wireless communication implemented by the telemetry unit of FIG. 2.

In some embodiments, the output signal from the sensor(s) 130 is converted from analogue to digital signals, if appropriate, and then interpreted and stored by the control module 230 in the memory 225 for subsequent transmission to server 405, as discussed below with reference to FIG. 4 and FIG. 6.

In some embodiments, the control module 230 may further process the data derived from the output signals of the sensor(s) 130 to compare measured values to preconfigured alarm condition levels. If an alarm condition is detected, for example, because the sensed measurement exceeds or is equal to the alarm threshold for a particular sensor type, then control module 230 may cause the transceiver 210 to be turned on (for example, by causing power supply 205 to supply power to transceiver 210) and an appropriate message to be transmitted to server 405.

At 320, the controller 200 awaits an output signal from the threshold level indicator 125 indicating that the fluid level in the fluid conduit 110 and/or manhole 105 has fallen below the threshold level associated with the threshold level indicator 125. Until the controller 200 receives an output signal from the threshold level indicator 125 indicating that the fluid level has fallen below the threshold level, it continues to record sensor readings received from the sensor(s) 130.

On receipt of an output signal from the threshold level indicator 130 indicating that the fluid level has fallen below the threshold level associated with the threshold level indicator 125, the controller 200 transmits at 325 a power switching signal 235 to the power supply 205 to cause the power supply 205 to discontinue or turn off the supply of power to the sensor(s) 130. In one embodiment, the processor 220 executes code to cause the controller 200 to transmit a power switching signal 235 to the power supply 205 to turn off the sensor(s) 130. In another embodiment, the switching circuit 240 is deactivated or "turned off" on receipt of an output signal from the threshold level indicator 130 indicating that the fluid level has fallen below the threshold level, thereby preventing a power switching signal 235 from being transmitted to the power supply 205 and causing the supply of power to the sensor(s) 130 to be discontinued.

Figure 4:
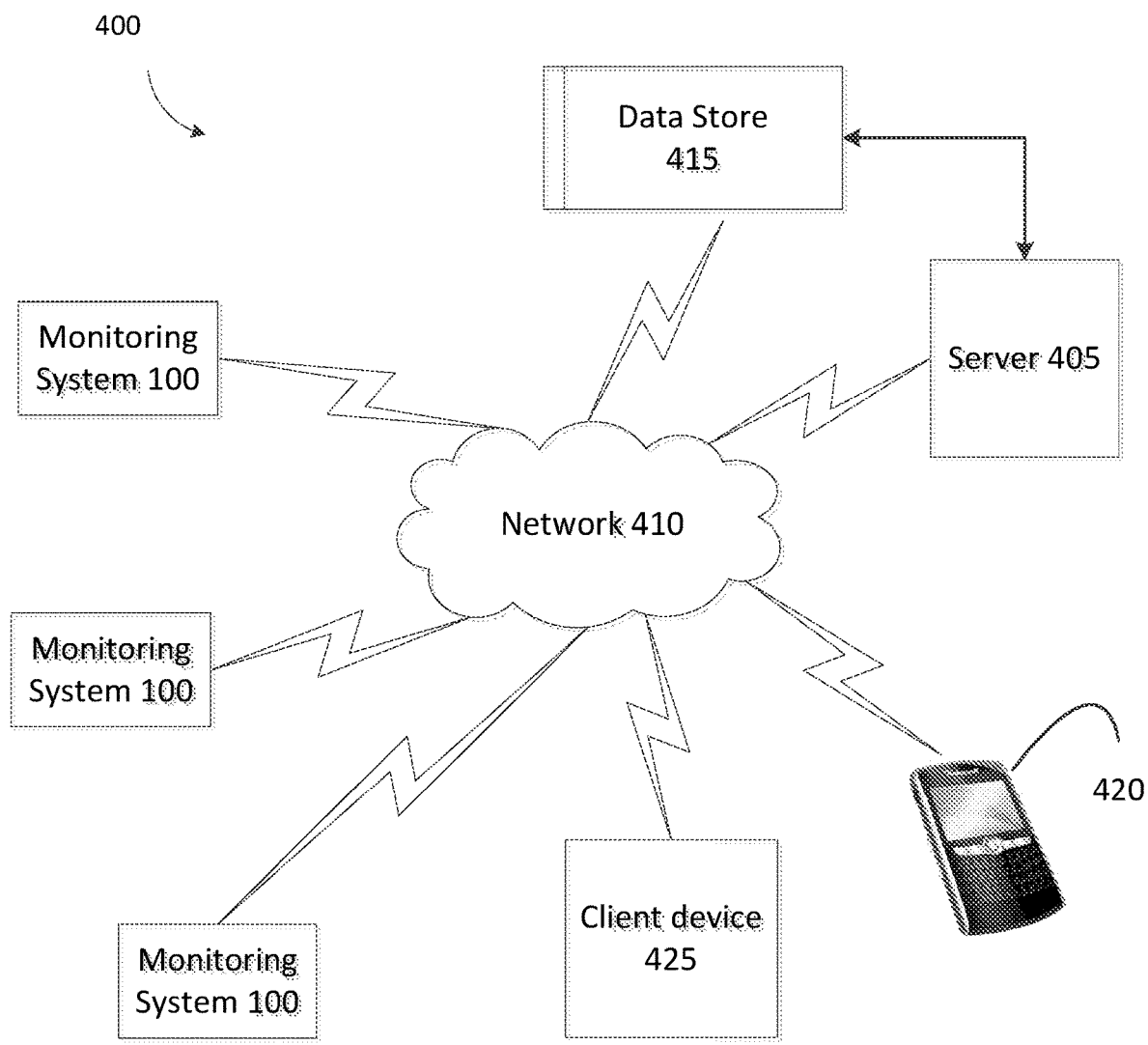
FIG. 4 is a block diagram of a wirelessly networked management system according to some embodiments.

Referring to FIG. 4, there is illustrated a management system 400 comprising monitoring systems 100 provided at multiple respective access chambers or manholes 105. The multiple manholes 105 may be located in different geographic locations where fluid conduits within the fluid supply or drainage network are accessible through the ground or other sub-surface structure. The multiple manholes 105 may be part of a single fluid supply and/or drainage zone within a larger fluid conduit network or may be spread across different zones and/or different networks. By way of example only, each zone may have one, two, three, four, five, six, seven, eight, nine, ten or more manholes 105 located at different positions within the zone. Further, there may be more than ten, for example between ten and possibly hundreds of such manholes 105 within a particular fluid conduit zone and/or network.

The management system 400 further comprises one or more servers or server systems, referred to herein for convenience as the server 405, arranged to communicate with the telemetry units 120 of the monitoring systems 100 across a communications network 410. In some embodiments, the telemetry units 120 of the monitoring systems 100 may be enabled for bidirectional communication with server 405, so that firmware updates can be received, diagnostic testing can be performed remotely and/or operation instructions for configuring operations of the sensor(s) 130 can be received. In other embodiments, the telemetry units 120 may be configured to only transmit data to the server 405, without receiving data or messages in return.

The management system 400 may also include at least one mobile client device 425, such as a smartphone or tablet, and/or at least one wired client device 420 and a data store 415, and the monitoring systems 100, the server 405, the at least one mobile client device 420 and/or the at least one wired client device 425 may be capable of communication with one another and with the data store 415 across the communications network 410. The communications network 410 may be a data network and may comprise suitable communications infrastructure that is at least partially wireless, such as a cellular network.

The server 405 may comprise, or be arranged or configured as, a supervisory control and data acquisition (SCADA) server to receive data from the management system 400 representative of the sensed fluid conditions of fluid in the conduits 110 or manholes 105 at various different locations.

The telemetry units 120 of the monitoring systems 100 may be configured to transmit data to the server 405 using the GSM or GPRS/3G standards for mobile telephony or their technological successors. Thus, the telemetry units 120 may communicate with the server 405 by direct mobile data communication using available mobile telephony infrastructure, rather than using a series of hops and other infrastructure to transmit messages. Alternatively, lower power, shorter distance wireless communication techniques may be employed, for example where a local wireless data hub is in sufficient proximity to support wireless communication with the telemetry unit 120 within a nearby manhole 105. For example, the communications network 410 may be a wireless point-to-point network. In some embodiments, the communications network 410 may be a wireless mesh network and the telemetry units 120 of the monitoring systems 100 may be configured to transmit data to the server 405 using packet routing protocols. For example, the wireless mesh network 410 may be a private and/or dedicated network 410.

In some embodiments, the controller 200 instigates the transmission of data to the server 405 on receipt of the output signal from the sensor(s) 130 indicative of the sensed fluid conditions in the conduit 110 and/or manhole 105, as described with reference to FIG. 5.

Figure 5:
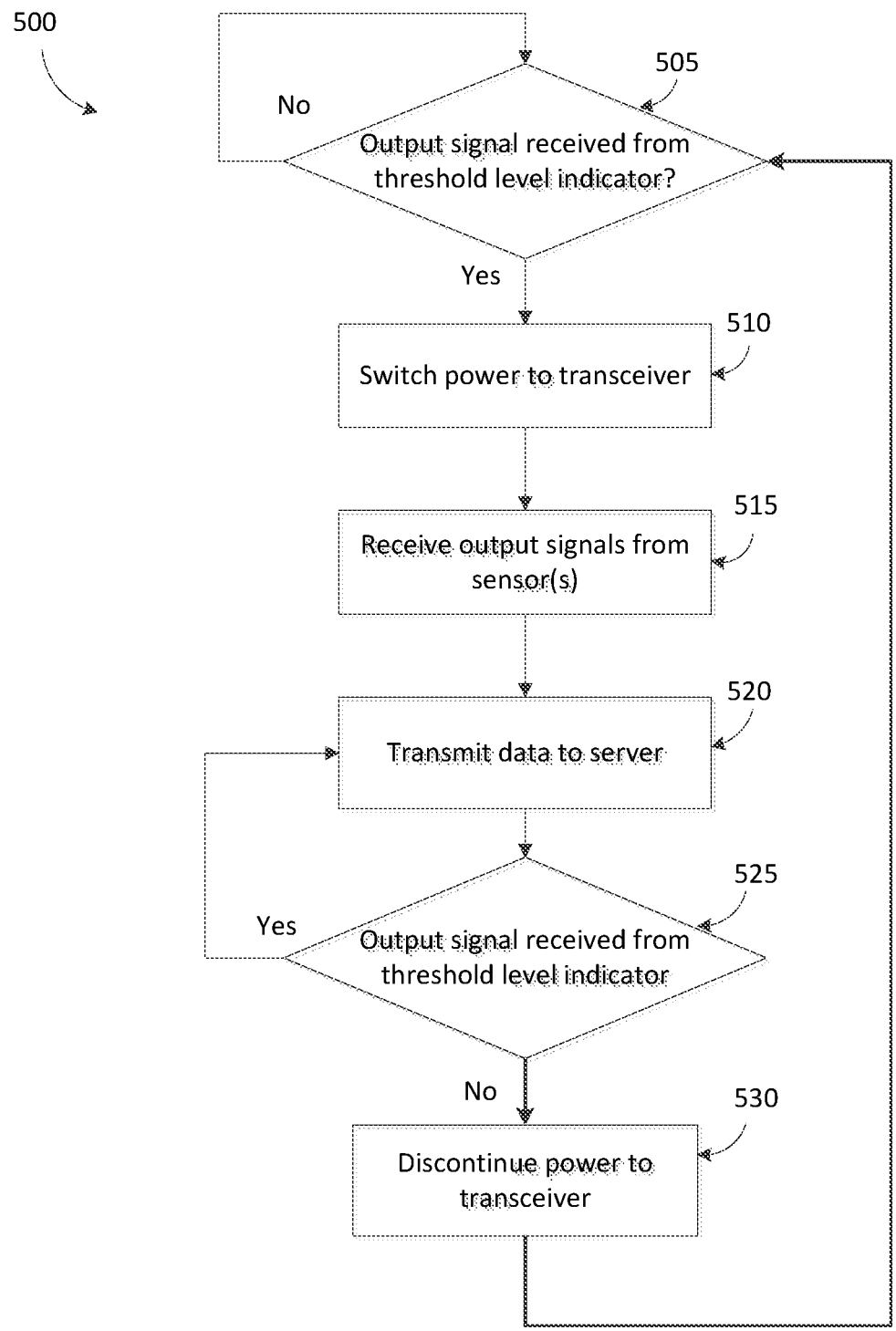
FIG. 5 is a flowchart of a method of wireless communication implemented by the telemetry unit of FIG. 2.

FIG. 5 is a flow diagram depicting a method 500 of transmitting data by the monitoring system 100. The method 500 may be executed by the controller 200 of the telemetry unit 120 to transmit data indicative of sensed conditions of fluid in the fluid conduit 110 with which the telemetry unit 120 is associated to the server 405.

At 505, the controller 200 awaits receipt of an output signal from the threshold level indicator 125 before instigating a process for the transmission of data to the server 405. Once an output signal from the threshold level indicator 125 is received, the transceiver 210 is turned on, for example, by transmitting a power switching signal 235 to the power supply 205 to cause power to be supplied to the transceiver 210 at 510. In one embodiment, the processor 220 executes code to cause the controller 200 to transmit the power switching signal 235 to the power supply 205 to turn on the transceiver 210. In another embodiment, the controller 200 includes a switching circuit 240, such as a transistor switch, wherein receipt of the output signal from the threshold level indicator 125 activates or "turns on" the switching circuit 240 allowing the power switching signal 235 to be transmitted to the power supply 205 to cause the transceiver 210 to be turned on.

At 515, the controller 200 receives an output signal from the sensor(s) 130. At 520, data indicative of the output signals from the sensor(s) 130 is transmitted to the server 405. For example, the data may include an identifier of the telemetry unit, a time stamp, an indication of one or more sensed values and/or an alarm or notification type.

At 525, the controller 200 may continue to transmit data to the server 405 while the output signal from the sensor(s) 130 is being received. Once the controller 200 receives an output signal from the threshold level indicator 135 indicative of the fluid level having fallen below the threshold fluid level, and/or detects that an output signal is no longer being received from the sensor(s) 130, the transceiver 210 is turned off, (for example, by causing power supply 205 to discontinue the supply of power to transceiver 210) at 525. In one embodiment, the processor 220 executes code to cause the controller 200 to transmit a power switching signal 235 to the power supply 205 to turn off the transceiver 210. In another embodiment, the switching circuit 240 is deactivated or "turned off" on receipt of an output signal from the threshold level indicator 130 indicating that the fluid level has fallen below the threshold level, thereby preventing a power switching signal 235 from being transmitted to the power supply 205 and causing the supply of power to the transceiver 210 to be discontinued.

In other embodiments, the controller 200 may also or instead instigate the transmission of data to the server 405 periodically, as described with reference to FIG. 6. FIG. 6 is a flow diagram depicting a method 600 of transmitting data by the monitoring system 100. The method 600 may be executed by the controller 200 of the telemetry unit 120 to transmit data indicative of sensed conditions of fluid in the fluid conduit 110 with which the telemetry unit 120 is associated to the server 405.

At 605, the controller 200 awaits expiration of an interval before instigating the transmission of data to the server 405. For example, the interval is 24 hours. However, in other embodiments, longer or shorter interval periods may be set, such as one or more hours or multiple days. Once the interval period has expired, the processor 220 executes code to cause the controller 200 to cause the transceiver 210 to be turned on (for example, by causing power supply 205 to supply power to transceiver 210) at 610.

At 615, data indicative of the output signals from the sensor(s) 130 is retrieved by the control module 230 from the memory 225, at 615 and is transmitted to server 405, at 620. For example, the data may include an identifier of the telemetry unit, a time stamp, an indication of one or more sensed values and/or an alarm or notification type. At 625, the processor executes code to cause the controller 200 to cause the transceiver 210 to be turned off (for example, by causing power supply 205 to discontinue the supply of power to transceiver 210) and the notification interval is reset, at 630.

Figure 7:
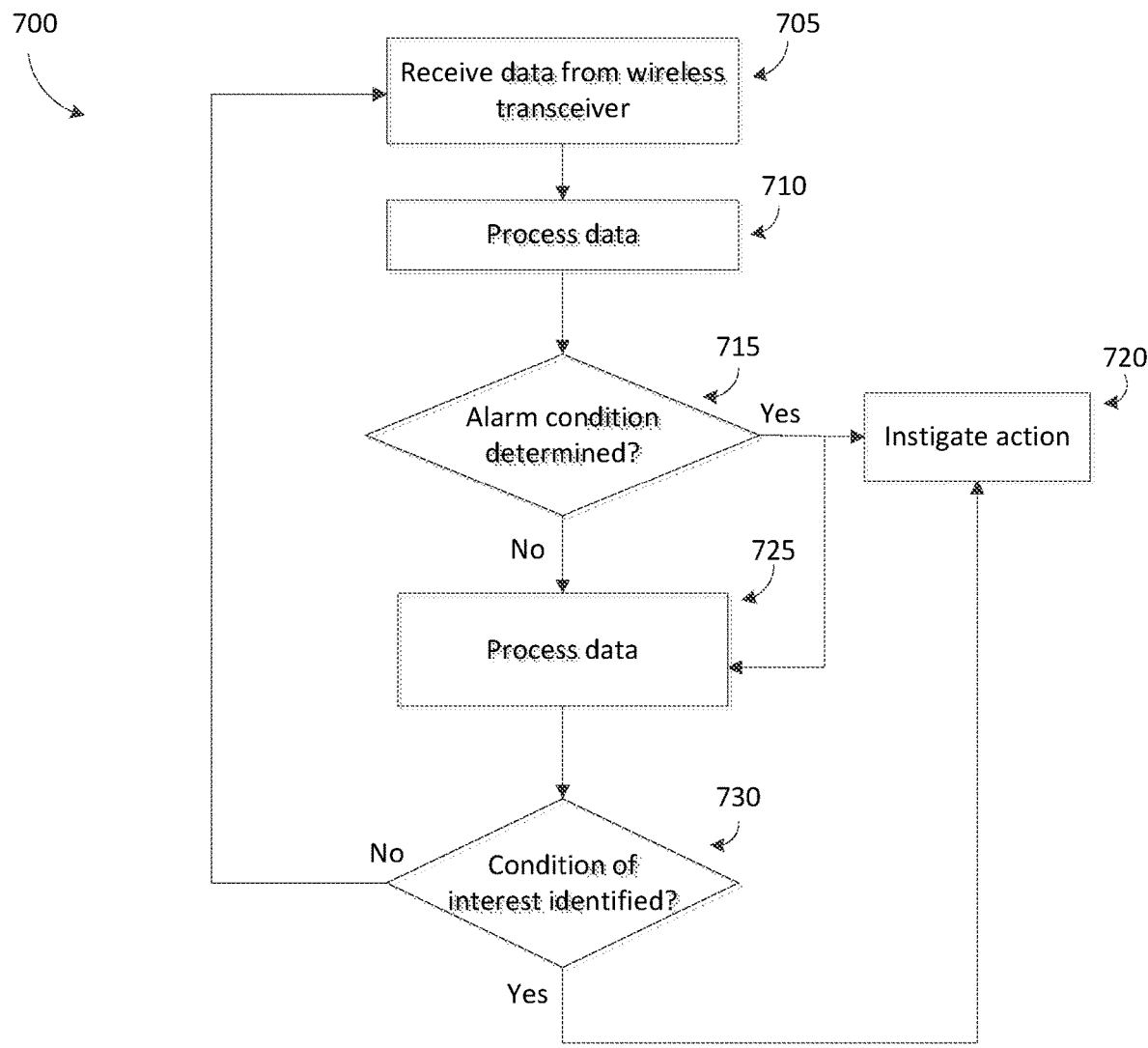
FIG. 7 is a flowchart of a method of processing data received by a server of the wirelessly networked management system of FIG. 4 from at least one of the monitoring systems of FIG. 2.

Referring to FIG. 7, a method 700 of processing data by the server 405 is shown and described in further detail. The method 700 may be executed by the server 405 to process data indicative of sensed conditions of fluid in a plurality of manholes 105 and/or fluid conduits 105 associated with a plurality of manholes 105.

At 705, the server 405 may receive data received from each of the telemetry units 120 associated with the monitoring systems 115. At 710, data received at server 405 may be processed to determine an alarm condition at manhole requiring action to be taken.

In some embodiments, the data received from the telemetry unit 120 may indicate an alarm condition in an associated manhole 105 as determined by the control module 230. In some embodiments, the server 405 may process the data to compare measured sensor values with preconfigured alarm condition levels to determine whether the measured sensor values exceed or equate with an alarm threshold for a particular sensor type.

At 715, if an alarm condition is determine to exist in any one or more of the manholes 105, the server 405 accesses data store 415 to determine a pre-determined appropriate action to be taken in relation to the specific alarm condition, and then takes the appropriate action, at 720. The action to be taken may vary, depending on the manhole 105, for example where some manholes 105 may play a more critical detection role than others. Such actions may include, for example, sending one or more notifications, for example in the form of text messages and/or emails, to one or more of client devices 420, 425.

For example, in the event that the data received at server 405 indicates that the level of fluid in the fluid conduit 110 and/or manhole 105 is rising, the data may be monitored and processed to determine a rate of level change of the fluid and to determine when the manhole will overflow if no action is taken. In this way, the monitoring and processing of the received data may provide advanced warning so that measures may be taken to prevent or at least mitigate any damage which may arise as a result of the rising fluid levels and may assist in determining how best to prioritise available resources.

At 725, regardless of whether an alarm condition is indicated by the data received at the server 405 from the monitoring systems 115, that data is processed and stored in data store 415 for later retrieval by a server process and/or at a request from a client device 420, 425.

The data store 415 may comprise any suitable data store, such as a local, external, distributed or discrete database. For example, the server 405 may execute processes (based on program code stored in data store 415, for example), to perform trending and reporting functions to one or more client devices 420, 425. In some embodiments, the server 405 may cause map-based displays or trending charts to be updated with new data, as appropriate, which may be accessible to and/or visible on client devices 320 or 325.

If a condition of interest is identified at 730 following processing of the data, then an action may be instigated, at 720, such as issuing a notification to maintenance and/or operational personnel, either by email or short messaging service (SMS), or other form of prompt electronically transmissible message that is suitable for emergency notification. In some embodiments, a stored rule may be set up to establish that a predetermined change of fluid level over a period of time, such as a week, that does not actually trigger an alarm condition may nevertheless be a condition of interest. As another example, a significant change in fluid flow or level patterns on a day to day, week to week or month to month basis may indicate a condition of interest.

The acts of method 700 may be repeatedly performed on a continual basis or periodically as messages are received from various telemetry units 120 in the field. The server 405 may also be used to wirelessly download updated firmware and/or perform diagnostic testing on the telemetry units 120 and/or to provide the controller 220 with operating instructions for the threshold level indicator(s) 125 and the sensor (s) 130. In this way, settings associated with the threshold level indicator(s) 125 and/or the sensor(s) 130 may be configured remotely.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A monitoring system for a manhole to a pipe network, the monitoring system comprising:
   at least one sensor for determining a fluid condition associated with fluid in a conduit of the pipe network;
   at least one threshold level indicator for determining a threshold fluid level in the manhole, the at least one threshold level indicator being associated with the at least one sensor;

a controller for receiving output signals from the at least one sensor and the at least one threshold level indicator and for controlling supply of power to the at least one sensor;

a wireless transceiver in communication with the controller to allow the controller to communicate with a remote server over a communications network;

wherein the controller is arranged to supply power to the at least one sensor in response to receiving an output signal from the at least one threshold level indicator indicative of a fluid level having exceeded the threshold fluid level, and wherein the controller is configured to determine a rate of level change of fluid based on data from the at least one sensor, determine if the manhole will overflow if no action is taken, and provide advance warning if the manhole will overflow.

2. The monitoring system of claim 1, wherein the controller is arranged to discontinue the supply of power to the at least one sensor in response to receiving an output signal from the at least one threshold level indicator indicative of the fluid level having fallen below the threshold fluid level.

3. The monitoring system of claim 1, wherein the controller is arranged to supply power to the wireless transceiver in response to receiving the output signal from the at least one threshold level indicator indicative of the fluid level having exceeded the threshold fluid level.

4. The monitoring system of claim 1, wherein the at least one sensor is a plurality of sensors, and wherein the at least one threshold level indicator is associated with a plurality of the sensors.

5. The monitoring system of claim 1, wherein the controller comprises a memory for storing data associated with the output signals from the at least one sensor indicative of fluid conditions in the conduit.

6. The monitoring system of claim 5, wherein the memory includes a control module comprising program code, which when executed by a processor, is arranged to cause the controller to interact with at least one SIM card in order to transmit and/or receive data wirelessly using the wireless transceiver.

7. The monitoring system of claim 5, wherein the memory includes a control module comprising program code, which when executed by a processor, is arranged to cause the controller to transmit a power switching signal to a power supply to control a supply of power to at least one of the sensor(s) and the wireless transceiver.

8. The monitoring system of claim 1, wherein the controller is configured to compare data associated with the received output signals to an expected range of values for each sensor and to transmit an alarm message if the data for at least one sensor falls outside an expected range for that sensor.

9. The monitoring system of claim 1, wherein the controller includes a switching circuit to control transmission of a switching signal to a power supply to control the supply of power to at least one of the sensor(s) and the wireless transceiver.

10. The monitoring system of claim 1, further comprising a wireless telemetry unit, wherein the controller and the wireless transceiver are provided within the wireless telemetry unit.

11. The monitoring system of claim 10, wherein the wireless telemetry unit comprises a first SIM card and a second SIM card, and wherein a processor is arranged to cause the controller to interact with the second SIM card in order to transmit and/or receive messages wirelessly using transceiver in response to determining that the first SIM card is ineffective.

12. The monitoring system of claim 1, wherein the monitoring system comprises a blockage detection system and wherein the at least one sensor is a fluid level sensor.

13. The monitoring system of claim 1, wherein the controller is configured to determine a flow rate in the conduit and/or manhole based on data received from the at least one sensor and parameters associated with the conduit and/or manhole.

14. A management system comprising:
a plurality of the monitoring systems of claim 1; and
a server arranged to receive data associated with sensed fluid conditions from wireless telemetry units of respective monitoring systems via a wireless network.

15. The management system of claim 14, wherein the server comprises program code to process the data according to a set of stored rules accessible to the server.

16. The management system of claim 15, wherein the server comprises program code to access stored historical data received from the wireless telemetry units and determine whether an event of interest appears to be occurring or is likely to occur in relation to a given conduit.

17. The management system of claim 14, wherein the server comprises an interface component to communicate with a client device in relation to the received data associated with the sensed fluid conditions.

18. The management system of 14, wherein the server is arranged to transmit data to the wireless telemetry units of respective monitoring systems via a wireless network.

19. The management system of claim 18, wherein the data comprises at least one of operating instructions for the controller, the sensor(s) and/or threshold level indicator(s).

20. The monitoring system of claim 1, wherein the at least one sensor includes an ultrasonic sensor.

21. A method of monitoring fluid conditions in a manhole to a pipe network, the method comprising:
providing a wireless telemetry unit within the manhole, the wireless telemetry unit coupled to receive output signals from at least one sensor for determining a fluid condition of fluid in conduit of the pipe network and at least one threshold level indicator for determining a threshold fluid level in the manhole, the at least one threshold level indicator being associated with the at least one sensor;
providing power to the at least one sensor in response to receiving an output signal from the at least one threshold level indicator indicative of a fluid level having exceeded the threshold fluid level;
receiving, at the wireless telemetry unit, output signals from the at least one sensor indicative of the fluid condition of fluid in the conduit;
determining, by the wireless telemetry unit, a rate of level change of fluid based on data from the at least one sensor;
determining, by the wireless telemetry unit, if the manhole will overflow if no action is taken; and
providing advance warning if the manhole will overflow.

* * * * *